(12) United States Patent
Born et al.

(10) Patent No.: US 9,121,467 B2
(45) Date of Patent: Sep. 1, 2015

(54) LOCKABLE PISTON-CYLINDER ASSEMBLY

(75) Inventors: Frank Born, Dienethal (DE); Rolf Mintgen, Thuer (DE); Dirk Rennecke, Andernach (DE); Bernd Rosenstein, Bonefeld (DE); Yukio Ushida, Toyoake (JP); Masaru Kaneko, Tokai (JP); Hiroshi Aoyama, Okazaki (JP)

(73) Assignee: Stabilus GmbH, Koblenz (DE)

( * ) Notice: Subject to any disclaimer, the term of this patent is extended or adjusted under 35 U.S.C. 154(b) by 1235 days.

(21) Appl. No.: 11/704,560

(22) Filed: Feb. 9, 2007

(65) Prior Publication Data

US 2007/0187198 A1    Aug. 16, 2007

(30) Foreign Application Priority Data

Feb. 10, 2006    (DE) .......................... 10 2006 006 091

(51) Int. Cl.
*F16D 69/00*    (2006.01)
*F16F 9/02*    (2006.01)
*F16F 5/00*    (2006.01)
*F16F 9/56*    (2006.01)

(52) U.S. Cl.
CPC ................. *F16F 9/0254* (2013.01); *F16F 9/56* (2013.01); *F16F 2230/0041* (2013.01)

(58) Field of Classification Search
CPC ................. F16F 7/09; F16F 9/00; F16F 9/02; F16F 9/0245; F16F 9/0254; F16F 9/3207; F16F 9/3235; F16F 9/38; F16F 9/56; F16F 2230/0041; F16F 2230/0035
USPC ............... 188/211, 265, 300, 322.12, 322.17; 267/64.12
See application file for complete search history.

(56) References Cited

U.S. PATENT DOCUMENTS

| | | | | |
|---|---|---|---|---|
| 3,628,637 A | * | 12/1971 | Axthammer | 188/300 |
| 4,596,383 A | * | 6/1986 | Howard | 267/64.12 |
| 4,744,548 A | * | 5/1988 | Hathaway | 267/64.12 |
| 4,813,100 A | * | 3/1989 | King | 16/49 |
| 5,358,225 A | | 10/1994 | Völpel et al. | |
| 5,456,699 A | * | 10/1995 | Armstrong | 606/108 |
| 6,135,434 A | * | 10/2000 | Marking | 267/64.26 |
| 6,273,405 B2 | | 8/2001 | Okamoto | |
| 6,601,834 B2 | * | 8/2003 | Perry | 267/64.12 |
| 2001/0002739 A1 | | 6/2001 | Okamoto | |
| 2007/0045058 A1 | | 3/2007 | Murota et al. | |

FOREIGN PATENT DOCUMENTS

| | | | |
|---|---|---|---|
| DE | 2630813 A | * | 1/1977 |
| DE | 34 33 735 | | 3/1986 |
| EP | 1 760 353 | | 3/2007 |

(Continued)

*Primary Examiner* — Melody Burch
(74) *Attorney, Agent, or Firm* — Cozen O'Connor

(57) ABSTRACT

A piston rod is connected to a piston and extends through a seal in the end face of a cylinder. A locking tube which surrounds the cylinder when the piston rod is retracted has a first end section mounted to the free end of the piston rod so that the locking tube is pivotable between a release position, wherein the locking tube is substantially coaxial to the piston rod, and a locking position, wherein the locking tube is inclined toward the piston rod. An opposed second end section has a supporting stop which can be positioned axially against the free end of the cylinder when the piston rod is extended and the locking tube is in the locking position. An actuable retaining device retains the locking tube in the locking position only by manually pivoting the locking tube into the locking position when the piston rod is extended.

11 Claims, 5 Drawing Sheets

(56) References Cited

FOREIGN PATENT DOCUMENTS

| GB | 1460948 A | * | 1/1977 |
| GB | 2365919 A | * | 2/2002 |
| JP | 62-134943 | | 8/1987 |
| JP | 1-128039 | | 8/1989 |
| JP | 11-201210 | | 7/1999 |
| WO | WO 02/055819 | | 7/2002 |

* cited by examiner

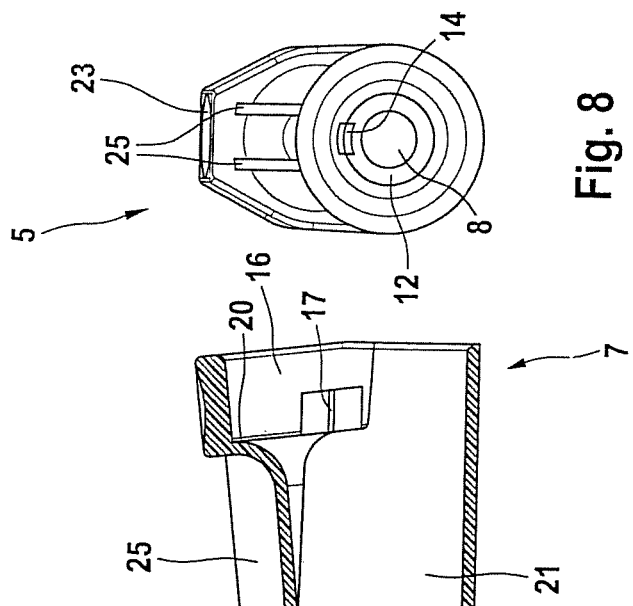
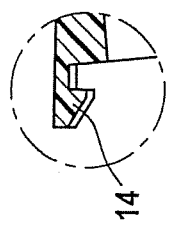
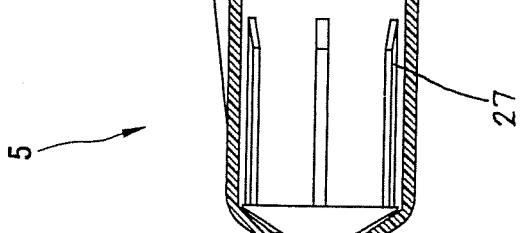
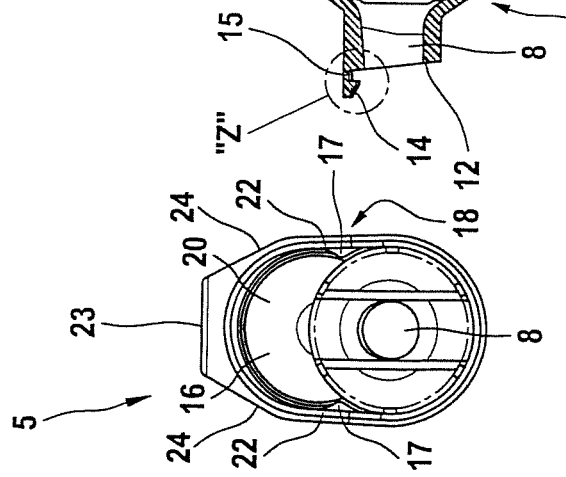

LOCKABLE PISTON-CYLINDER ASSEMBLY

BACKGROUND OF THE INVENTION

1. Field of the Invention

The invention relates to a lockable piston-cylinder assembly, in particular a gas-pressure spring or a damper with a cylinder arrangement having a closed cylinder in which a piston dividing the cylinder into a first and a second chamber is guided movably, and a piston rod leading out of the cylinder interior is sealed at one end face of the cylinder. A locking tube surrounding the cylinder arrangement has a first end section pivotably mounted at the free end of the piston rod for pivoting between a release position coaxial to the piston rod for and a locking position inclined towards the axis of the piston rod, and a second end section with a supporting stop such that the locking tube can be pivoted into the locking position when the piston rod is extended.

2. Description of the Related Art

With a gas-pressure spring of this type that is used for example for opening of hatches or doors, in particular on motor vehicles, it is known that the locking tube is permanently loaded toward its inclined locking position by a spring. When the piston rod extends, the locking tube thus slides with its end section opposite the free end of the piston rod at one end along the cylinder until, after overriding the cylinder end, it pivots into the locking position. In this position, part of the opening of the locking tube is opposite the corresponding end face of the cylinder and forms a stop which the end of the locking tube contacts and prevents any further retraction of the piston rod.

Only after a manual of the locking tube can the piston rod retract back into the cylinder.

This gas-pressure spring has the disadvantage that with every extension of the piston rod beyond a certain extension length, a locking always occurs automatically that then has to be released manually.

SUMMARY OF THE INVENTION

An object of the invention is to provide a piston-cylinder assembly with a simple design that is lockable and unlockable only when required.

According to the invention, the locking tube can be held in its locking position by an actuatable retaining device.

As locking or unlocking is performed only with an in particular manual actuation of the retaining device, an inconvenient automatic blocking of the extended piston-cylinder assembly is avoided. Only when locking in the extended position is really desired is this deliberately effected and just as deliberately released again when desired.

A simple construction with few parts is obtained if the locking tube can be connected to part of the cylinder arrangement when in its locking position by means of the retaining device.

If the locking tube can be connected to part of the cylinder arrangement when in its locking position by means of a latching device, this results in a simple and easy actuation.

In a simple embodiment, the locking tube has one or more latching springs that, during pivoting can be deflected against their spring force by part of the cylinder and can engage behind this part in the locking position.

Alternatively, the cylinder arrangement can have one or more latching springs that, during pivoting, can be deflected against their spring force by part of the locking tube and can engage behind this part in the locking position.

No particular additional components are necessary if the part of the cylinder arrangement by which the latching spring or the latching springs can be deflected against their spring force and can engage behind this part in the locking position is the piston rod or the cylinder.

According to a simple embodiment with uniform loading of the components, the latching springs are formed by a clip located on the locking tube and having a through opening of equal or larger diameter than the diameter of the piston rod or of the cylinder. A clip opening facing towards the piston rod or cylinder and having a smaller width than the diameter of the piston rod or cylinder opens radially outwards and the clip arms are formed under spring load radially at right angles to the axis of the piston rod.

An integral embodiment for additional opening of the clip is achieved if the clip on its area diametrically opposite the clip opening has an actuating area that can be pressurized radially to the continuous opening to spread the clip arms.

Only minor installation work is necessary if the locking tube is designed as an injection molding made of plastic and forms a single part together with the latching springs.

For simple installation of the locking tube on the piston rod, the locking tube can be connected at its first end section to the free end of the piston rod by means of a latching device.

A simple pivoting connection of the locking tube with the piston rod is achieved by an opening at the first end section of the locking tube, through which the free end of the piston rod is guided with clearance and is connected to the locking tube.

The free end of the piston rod protruding out of the locking tube can thereby have a stop that is supported axially on the mouth area of the opening of the locking tube.

A simply installed embodiment that also positions the locking tube correctly in relation to the piston rod is provided by a latching device having a latching arm extending axially to the piston rod and away from the second end of the locking tube. The free end of the latching arm has a latching detent which can engage a latching lug at the free end of the piston rod so that the stop at the free end of the piston rod is held in contact with the mouth area of the locking tube.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 6 shows a sectional view of the locking tube according to FIG. 4;

FIG. 7 shows a mounting-side end view of the locking tube according to FIG. 4;

FIG. 8 shows a locking-side end view of the locking tube according to FIG. 4; and FIG. 9 shows a magnified view of the detail Z from FIG. 6.

DETAILED DESCRIPTION OF THE PRESENTLY PREFERRED EMBODIMENTS

Figure 1:
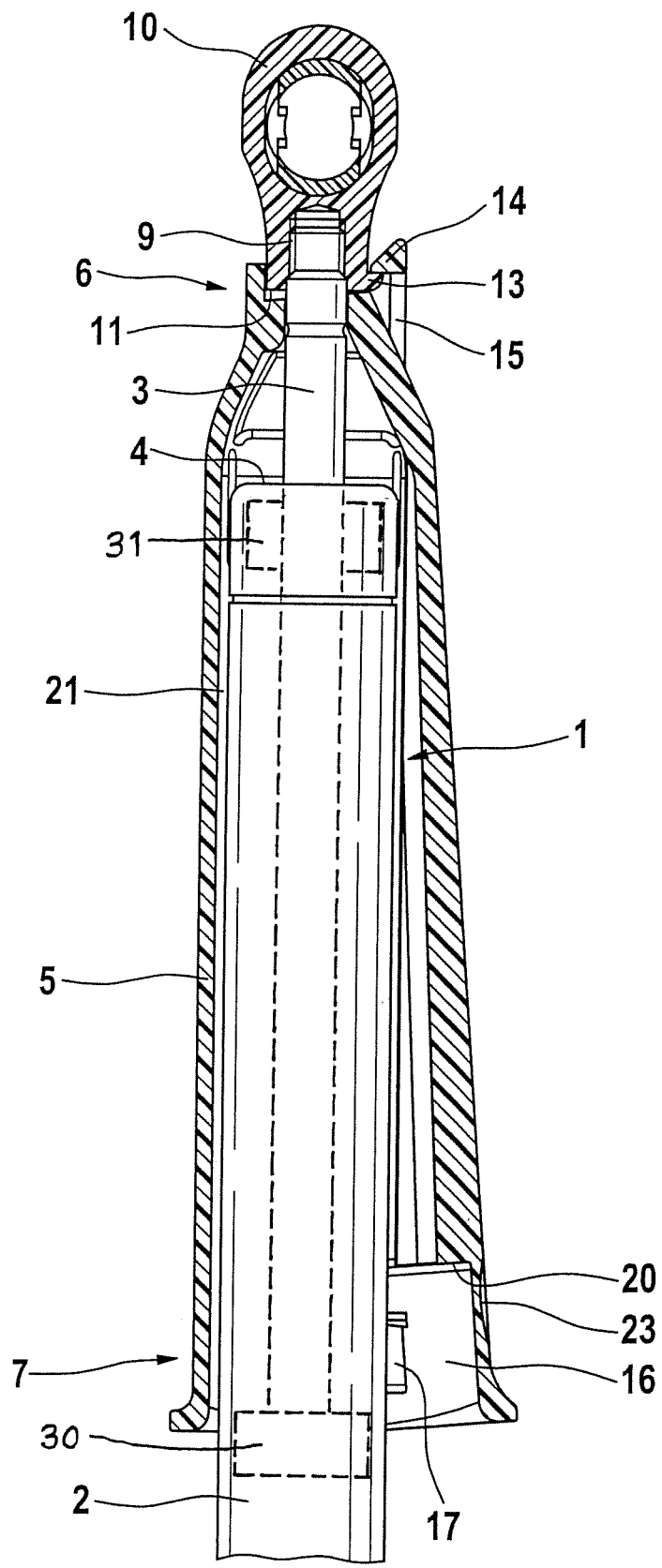
FIG. 1 shows a detail from a side view of a piston-cylinder assembly in retracted position.

The piston-cylinder assembly illustrated, designed as a lockable gas-pressure spring, has a cylinder arrangement 1 with a closed cylinder 2 in which a piston 30 that divides the cylinder interior filled with a pressure gas into a first and a second chamber is guided movably.

A piston rod 3 is guided out of the cylinder interior through a seal 31 at the one end face 4 of the cylinder 2. The two chambers of the cylinder interior are connected to one another by a regulating connection (not illustrated).

At the free end of the piston rod 3 is a locking tube 5 surrounding the cylinder arrangement 1 and having a first end section 6 pivotably arranged on the piston rod 3 and a second end section 7 extending towards the cylinder 2.

Figure 3:
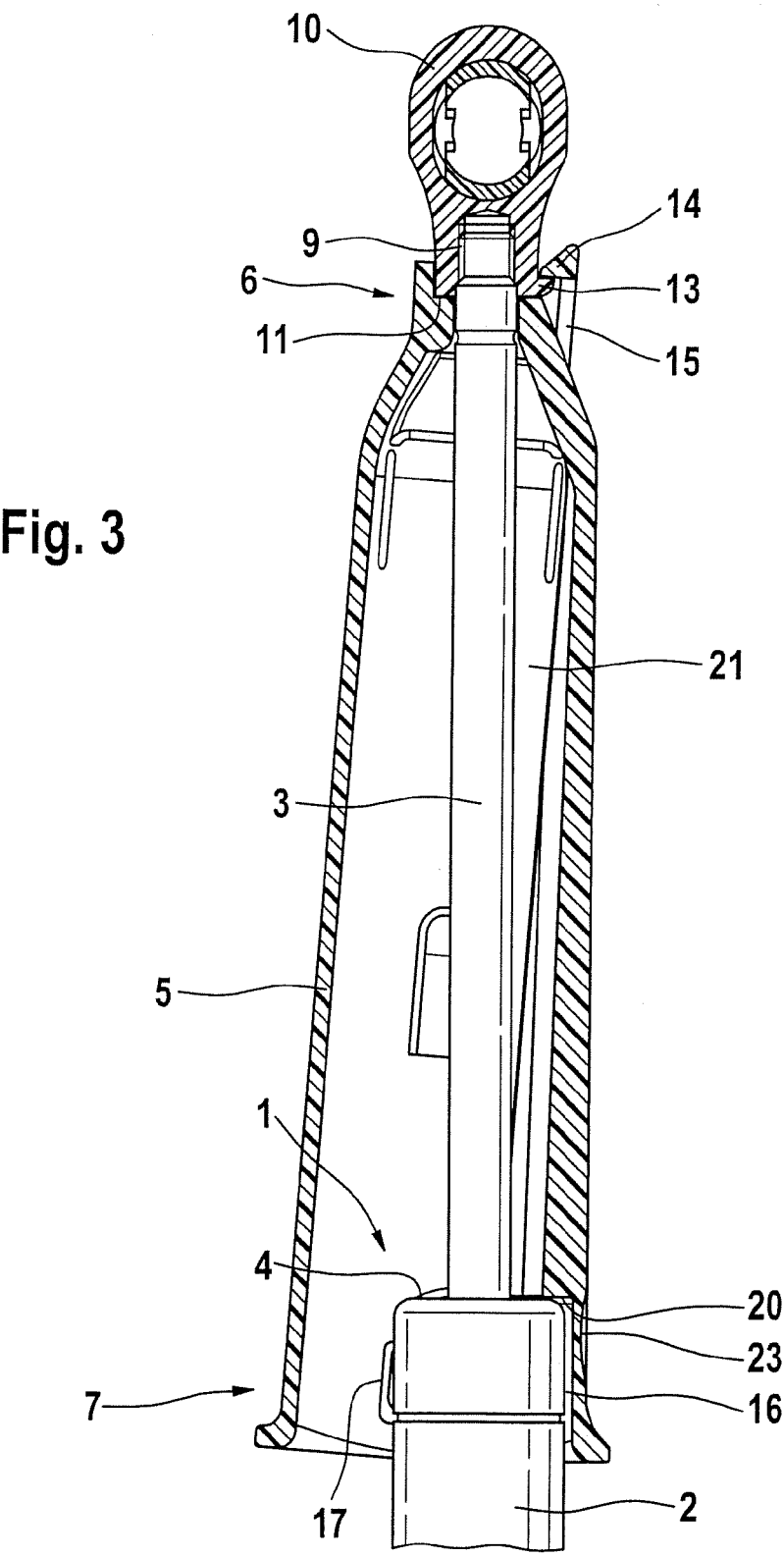
FIG. 3 shows the piston-cylinder assembly according to FIG. 1 in extended, locked position.
Figure 4:
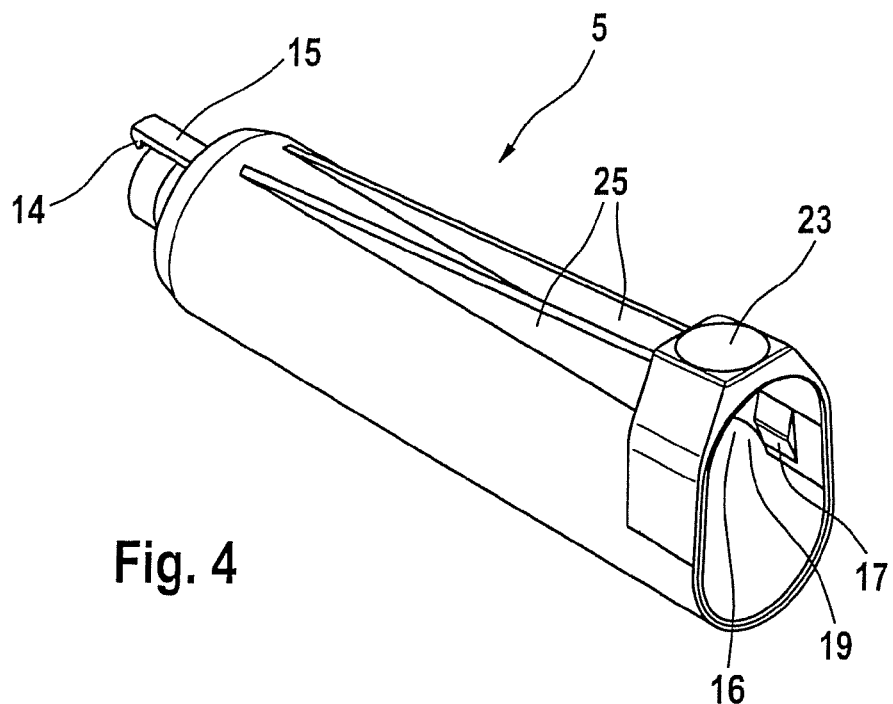
FIG. 4 shows a first perspective view of the locking tube of the piston-cylinder assembly gas-pressure spring according to FIG. 1.
Figure 5:
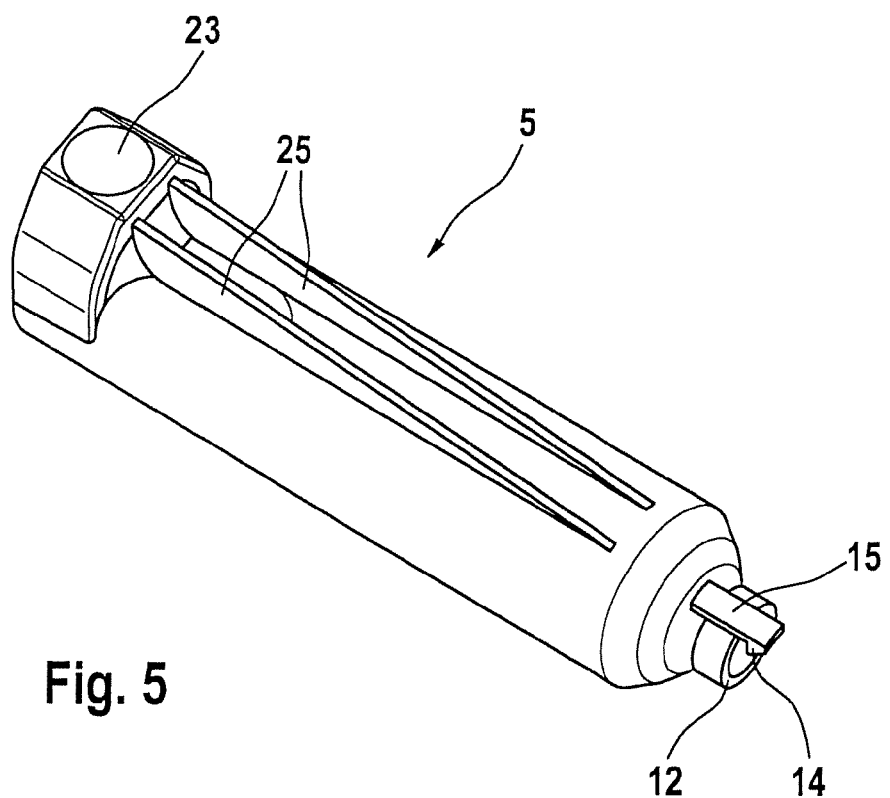
FIG. 5 shows a second perspective view of the locking tube of the piston-cylinder assembly according to FIG. 1.

The locking tube 5 exhibits in its first end section 6 an axial opening 8 through which the free end of the piston rod 3 is guided with clearance in such a way that the locking tube 5 is pivotable relative to the piston rod 3 when the piston rod 3 is extended, as seen in FIG. 3. The inside surface 21 of the locking tube 5, from the opening 8 to the second end section 7, is for this purpose significantly larger than the opening 8. Toward the first end section 6, the inside surface 21 is provided with ribs 27 (FIG. 6) which contact the cylinder 2 to provide a stable fit when the piston rod is retracted.

Screwed onto the threaded free end 9 of the piston rod 3 is a mounting element 10 whose end facing the locking tube 5 forms an end stop 11 that is supported axially on the mouth area 12 of the opening 8.

The mounting element 10 has a radially protruding latching lug 13 that is engaged by a latching hook 14 so that the stop 11 of the mounting element 10 is held in contact with the mouth area 12 of the locking tube 5. The latching hook 14 is arranged at the free end of a latching arm 15 that extends roughly axially to the longitudinal extension of the locking tube 5 in the direction of its second end section 7 and forms a single part together with the locking tube 5.

The latching hook 14 engages behind the latching lug 13 with a preload oriented to the longitudinal axis of the piston rod 3.

The second end section 7 of the locking tube 5 has an inside surface 16 formed with an oval cross-section which joins the inside surface 21 at a shoulder 20, the width of the cross-section being slightly larger than the outside diameter of the cylinder 2 in the area of its face end 3.

In the middle section of the inside surface 16, two opposed latching springs 17 are formed as a single part with the locking tube 5 to form a clip 18 whose clip opening 19 is narrower than the outside diameter of the cylinder 2.

The latching springs 17 can be deflected elastically outwards so that when the piston rod 3 is extended, the locking tube 5 can be pivoted manually into or out of a position inclined towards the axis of the piston rod 3 so that the latching springs 17 can override the end section of the cylinder 2 close to the end face 4.

Figure 2:
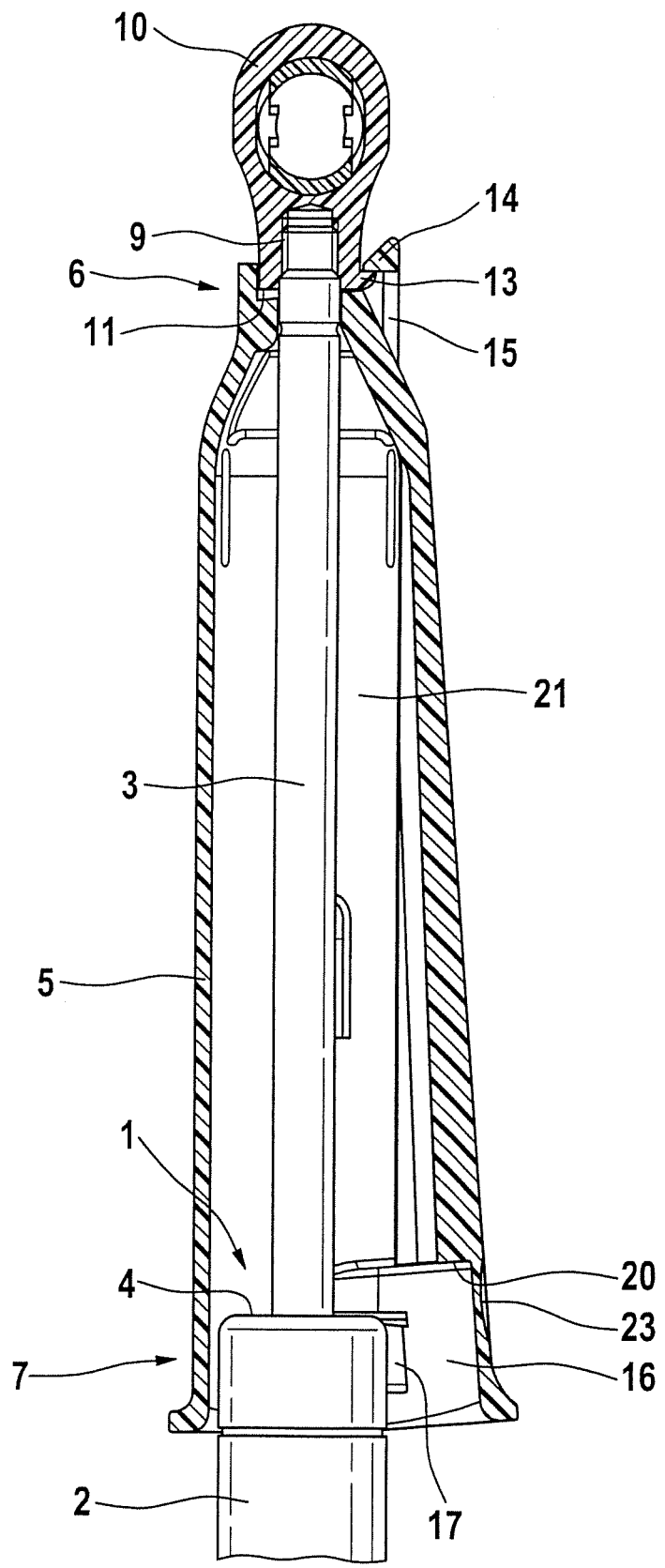
FIG. 2 shows the piston-cylinder assembly according to FIG. 1 in extended, non-locked position.

If piston rod 3 and locking tube 5 are aligned roughly coaxially to one another (FIGS. 1 and 2), the gas-pressure spring is in its release position so that the piston rod 3 can extend and retract unhindered.

If the locking tube 5 is pivoted manually out of its release position with the piston rod 3 extended, overriding the latching springs 17, into a position in which the locking tube 5 is inclined towards the piston rod 3, the gas-pressure spring is in its locking position (FIG. 3).

In so doing, the end face 4 of the cylinder 2 makes axial contact with a supporting stop formed as a shoulder 20 of the locking tube 5. The piston rod 3 is thus prevented from making a retraction movement into the cylinder 2.

Clip arms 22 extend to the area of the clip 18 diametrically opposite the clip opening 19 and are connected to one another by an actuating area 23.

The transitional areas 24 from the clip arms 22 to the actuating area 23 are stiffened by longitudinal webs 25 of the locking tube 5 so that in the case of a radially inward manual pressurization of the actuating area 23, the clip arms 22 are pivoted away from one another, allowing the latching springs 17 to also move radially away from one another.

The locking tube 5 can then be slewed easily back into its release position and the piston rod 3 can retract unhindered into the cylinder 2.

Pivoting from the release position to the locking position and vice versa is only possible manually and deliberately.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A lockable piston-cylinder assembly comprising:
a cylinder having an end face;
a piston guided movably in the cylinder;
a piston rod connected to the piston and extending through a seal in the end face of the cylinder, the piston rod having an axis and a free end outside the cylinder, the piston rod being movable through the free end between a retracted position and an extended position;
a locking tube having a first end section and an opposed second end section, the locking tube surrounding the cylinder when the piston rod is in the retracted position;
the first end section being pivotably mounted to the free end of the piston rod so that the locking tube is pivotable between a release position, wherein the locking tube is substantially coaxial to the piston rod, and a locking position, wherein the locking tube is inclined to the axis of the piston rod;
the second end section having a supporting stop which can be positioned axially against an end face of the cylinder when the piston rod is extended and the locking tube is pivoted into the locking position; and
a latching device for retaining the locking tube in the locking position, the latching device comprising a pair of resilient clip aims having a respective pair of clips spaced apart by less than a diameter of the cylinder, each of said pair of clips deflecting against a spring force normal to the axis of the piston rod when the locking tube is manually pivoted from the release position into the locking position when the piston rod is extended and engaging the cylinder when the locking tube is pivoted from the release position to the locking position;

wherein the resilient clip arms are fixed to the second end section of the locking tube at an actuating area opposite from said respective pair of clips, the clip arms are connected to one another by said actuating area, and transitional areas from the clip arms to the actuating area are stiffened by longitudinal webs of the locking tube such that said respective pair of clips are spreadable apart by pressing said actuating area radially toward said cylinder.

2. The piston-cylinder assembly of claim 1 wherein the latching device fixes the locking tube to the cylinder when the locking tube is in the locking position.

3. The piston-cylinder assembly of claim 1 wherein the latching device is fixed to the locking tube and engages one of the piston rod and the cylinder when the locking tube is pivoted from the release position to the locking position.

4. The piston-cylinder assembly of claim 3 wherein the locking tube is made of injection molded plastic, the latching device being molded as one piece with the locking tube.

5. The piston-cylinder assembly of claim 1 wherein the first end section of the locking tube has an opening which receives the piston rod therethrough with clearance which permits pivoting.

6. The piston-cylinder assembly of claim 5 wherein the first end section of the locking tube is connected to the piston rod by the latching device.

7. The piston-cylinder assembly of claim 5 wherein the opening in the first end section of the locking tube is surrounded by a mouth area, the free end of the piston rod having an end stop which is supported axially on the mouth area when the piston rod is in the retracted position.

8. The piston-cylinder assembly of claim 7 wherein the latching device comprises a latching arm fixed to the locking tube and a latching lug fixed to the free end of the piston rod, the latching arm having a detent which resiliently engages the lug to hold the end stop in contact with the mouth area.

9. The piston-cylinder assembly of claim 1 wherein the second end section of the locking tube has an enlarged cross-section which is axially bounded by a shoulder which forms said supporting stop.

10. The piston-cylinder assembly of claim 1 wherein the locking tube has an inside surface formed with a plurality of axially extending ribs which positively position the locking tube with respect to the cylinder when the piston rod is in the retracted position.

11. The piston-cylinder assembly of claim 8 further comprising a mounting element fixed on the free end of the piston rod, the end stop and the lug being formed on the mounting element.

* * * * *